US010336352B2

(12) United States Patent
Maurice et al.

(10) Patent No.: US 10,336,352 B2
(45) Date of Patent: Jul. 2, 2019

(54) INERTIAL TRACK MEASUREMENT SYSTEM AND METHODS

(71) Applicant: HARSCO TECHNOLOGIES LLC, Fairmont, MN (US)

(72) Inventors: Peter Maurice, Columbia, SC (US); Joseph Palese, Sewell, NJ (US); Sergio DiVentira, Cherry Hill, NJ (US); James Resio, Columbia, SC (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 89 days.

(21) Appl. No.: 15/687,460

(22) Filed: Aug. 26, 2017

(65) Prior Publication Data

US 2018/0057029 A1    Mar. 1, 2018

Related U.S. Application Data

(60) Provisional application No. 62/380,277, filed on Aug. 26, 2016, provisional application No. 62/380,288, filed on Aug. 26, 2016.

(51) Int. Cl.
*B61L 23/04* (2006.01)
*B61K 9/08* (2006.01)
(Continued)

(52) U.S. Cl.
CPC ............. *B61L 23/047* (2013.01); *B61C 7/04* (2013.01); *B61D 15/00* (2013.01); *B61K 9/08* (2013.01);
(Continued)

(58) Field of Classification Search
CPC .. B61C 7/04; B61D 15/00; B61K 9/08; B61L 23/047; B61L 23/048; B61L 25/025;
(Continued)

(56) References Cited

U.S. PATENT DOCUMENTS 5,986,547 A * 11/1999 Korver .................. G01S 5/0247
246/121
6,373,403 B1 * 4/2002 Korver .................. G01C 21/00
246/120
(Continued)

FOREIGN PATENT DOCUMENTS

EP        0739685 A2    10/1996
WO    2005093157 A1    10/2005

OTHER PUBLICATIONS

An International Search Report and Written Opinion of the International Searching Authority dated Nov. 17, 2017 in connection with International patent application No. PCT/US2017/048782.

*Primary Examiner* — Atul Trivedi
(74) *Attorney, Agent, or Firm* — Baker & McKenzie LLP

(57) ABSTRACT

A track geometry measurement system includes a plurality of wheels, a frame, an inertial measurement unit, a global positioning system, and a processor. The plurality of wheels are operable to trail over rail track. The frame is coupled to the wheels. The inertial measurement unit (IMU) is coupled to the frame. The global positioning system (GPS) is coupled to the frame. The processor is configured to determine a relative position of a portion of the frame based on data from the GPS and data from the IMU.

18 Claims, 7 Drawing Sheets

(51) Int. Cl.
*B61C 7/04* (2006.01)
*B61D 15/00* (2006.01)
*B61L 25/02* (2006.01)

(52) U.S. Cl.
CPC ........... *B61L 23/048* (2013.01); *B61L 25/025* (2013.01); *B61L 25/026* (2013.01); *B61L 2205/04* (2013.01); *Y02T 30/16* (2013.01); *Y02T 30/30* (2013.01)

(58) Field of Classification Search
CPC .... B61L 25/026; B61L 2205/04; Y02T 30/16; Y02T 30/30
USPC .......................................................... 701/19
See application file for complete search history.

(56) References Cited

U.S. PATENT DOCUMENTS

| | | | | |
|---|---|---|---|---|
| 9,810,533 B2* | 11/2017 | Fosburgh | ................ | B61K 9/08 |
| 2004/0140405 A1* | 7/2004 | Meyer | .................. | B61L 25/021 |
| | | | | 246/122 R |
| 2004/0173033 A1* | 9/2004 | Gilbert | .................... | B61K 9/08 |
| | | | | 73/862 |
| 2005/0065726 A1* | 3/2005 | Meyer | ................... | B61L 25/021 |
| | | | | 701/470 |
| 2010/0107925 A1 | 5/2010 | Bounds | | |
| 2012/0192756 A1 | 8/2012 | Miller et al. | | |
| 2012/0296562 A1* | 11/2012 | Carlson | ................ | B61L 15/0027 |
| | | | | 701/301 |
| 2013/0078624 A1* | 3/2013 | Holmes | .................... | C12Q 1/00 |
| | | | | 435/6.11 |
| 2014/0297069 A1 | 10/2014 | Landes et al. | | |
| 2015/0268172 A1* | 9/2015 | Naithani | ................ | B61K 9/08 |
| | | | | 348/129 |
| 2015/0301533 A1* | 10/2015 | Preston | ................. | G05D 1/0212 |
| | | | | 701/50 |
| 2016/0046308 A1* | 2/2016 | Chung | .................. | B61L 25/025 |
| | | | | 701/20 |
| 2016/0221592 A1* | 8/2016 | Puttagunta | .............. | B61L 23/34 |
| 2016/0244076 A1* | 8/2016 | Hyde | ................... | B61L 23/042 |
| 2016/0327383 A1* | 11/2016 | Becker | ................. | G01B 11/005 |
| 2017/0080960 A1* | 3/2017 | Moeller | ................ | B61L 23/047 |
| 2018/0222504 A1* | 8/2018 | Birch | .................... | B61L 23/045 |
| 2018/0339720 A1* | 11/2018 | Singh | ...................... | B61K 9/08 |

* cited by examiner

INERTIAL TRACK MEASUREMENT SYSTEM AND METHODS

CROSS-REFERENCE TO RELATED APPLICATIONS

This application claims priority to U.S. Provisional Application No. 62/380,288, filed Aug. 26, 2016 and U.S. Provisional Application No. 62/380,277, filed Aug. 26, 2016, the entire contents of each of which is incorporated herein by reference in their entirety.

BACKGROUND

Railroads are typically constructed to include a pair of elongated, substantially parallel rails, which are coupled to a plurality of laterally extending ties. The ties are disposed on a ballast bed of hard particulate material such as granite. Over time, normal operations on the railroad may cause the rails to deviate from a desired geometric orientation.

Rail maintenance processes for addressing such concerns typically involve the use of a tamping machine with a versine based measurement system composed of a system of buggies and chord measurement devices, which cooperate with each other to provide a reference system to measure the position of the track prior to applying the desired corrections to the track. A typical correction process involves lifting rail with mechanical clamps, aligning the track by shifting it to a calculated lateral position, and then tamping the ballast under each tie to hold the track in the desired position. This work sequence is typically repeated at each tie during the course of the correction process.

Reference points are used to establish a geometry of the track at the particular location being worked. That is, the recorded values are used to triangulate the geometry of the section of track being worked, while an onboard computer compares the previous section of track already corrected to the current section and makes the calculations for the required corrections to be made at the work heads.

In the railway industry, track geometry measurement is used to measure the spatial relationship of one rail with reference to another. This can be achieved using a chord based measurement by hand, or an automated chord based measurement system using a contact measuring device with respect to a rigid frame. The resulting data from these measurement systems is used to specify various maintenance activities, such as tamping.

The precision and accuracy of the track geometry measurement requirements vary based on operations. In the case of a high speed line on which trains travel at a high speed (for example over 200 kph), an acceptable wavelength for track deviations can be quite high. For example, to damp oscillations and limit suspension movement at a frequency of 1 Hz, a distance of a wavelength from a peak through a valley to a next peak may be 200 m or greater. For slower speed lines (<100 kph), wavelengths of 20 m are considered.

When considering tamping activities, it is also necessary to calculate a correction to the track geometry, based on either a smoothing of the measured track, or with reference to a defined location in space. During tamping activities the track position may be changed in the area of only some millimeters up to several centimeters. Thus, very precise measurements over long distances may be needed.

For some of these corrections (tamping to an absolute track position and not only smoothing of the track geometry) additional measurements are carried out to acquire the absolute position of the track relative to track-side reference points considered to be fixed in space. Such reference points are often mounted on catenary masts, other fixed objects, survey markers, etc.

To measure absolute position of the track at discrete locations, the position of the track may be measured relative to reference points by manual or semi-manual measurement using hand laser tools and D-GPS. However, measurements using these methods are time-intensive (hand laser tools) and relatively inaccurate (D-GPS—when used for measurements under a normally used period of time).

Measurements carried out with laser measurement systems to acquire the position of the track relative to the track-side reference points may be used for tamping operations. However, these laser measurement systems require a first operator team in front of the vehicle to place measurement equipment on the track rails to measure the position of the track. A second operator team is required behind the vehicle to place measurement equipment on the track rails after the vehicle has performed work to verify the adjusted position of the track. The presence of the operator team working on the track also leads to safety personnel being required to secure the work of the measurement team. In sum, 2-6 persons per tamping shift may be required to perform these measurements. Thus, laser measurement systems are slow and labor intensive. Further, laser measurement generally requires some kind of operator interaction to carry out.

To obtain accurate measurements carried out with a D-GPS system, the system may be required remain stationary for an extended period of time, sometimes many hours, to obtain enough data to average to determine an accurate absolute location suitable for tamping operations. Such an approach is not practical.

BRIEF SUMMARY

The present disclosure relates to systems and methods for an inertial based precision track geometry measurement system.

In an example, a track geometry measurement system includes a plurality of wheels, a frame, an inertial measurement unit, a global positioning system, and a processor. The plurality of wheels are operable to trail over rail track. The frame is coupled to the wheels. The inertial measurement unit (IMU) is coupled to the frame. The global positioning system (GPS) is coupled to the frame. The processor is configured to determine a relative position of a portion of the frame based on data from the GPS and data from the IMU.

In another example, a tamper includes a plurality of wheels, a frame, a work head, an inertial measurement unit, a global positioning system, and a processor. The plurality of wheels are operable to trail over rail track. The frame is coupled to the wheels. The work head is operable to tamp ballast and coupled to the frame. The inertial measurement unit (IMU) is coupled to the frame. The global positioning system (GPS) is coupled to the frame. The processor is configured to determine a relative position of a portion of the frame based on data from the GPS and data from the IMU and to control the work head to tamp the ballast based on the IMU data.

BRIEF DESCRIPTION OF THE DRAWINGS

Reference is now made to the following descriptions taken in conjunction with the accompanying drawings.

DETAILED DESCRIPTION

Various aspects of an inertial based track geometry measurement system and related methods according to the present disclosure are described. It is to be understood, however, that the following explanation is merely exemplary in describing the devices and methods of the present disclosure. Accordingly, any number of reasonable and foreseeable modifications, changes, and/or substitutions are contemplated without departing from the spirit and scope of the present disclosure.

A tamping machine is one of many applications that may use design estimates of curvature and superelevation to properly align the track. Deviations from the design may be referred to as errors in the track. A front measurement buggy of the machine may follow uncorrected track as the machine works. Estimation of the track errors in relation to the design may be used by the machine to compensate for the errors at the front measurement buggy. Other applications for inertial based track geometry measurement include anchor adjustors, rail benders, and so forth.

Many track maintenance operations may be carried out based on earlier acquired data, which may be analyzed before hand to create a plan for the track work. It is therefore preferable to know where a piece of maintenance equipment is located with precision to align a current location of the equipment with a location in the previously acquired data set.

Tamping, for example, may use a chord based measurement system by utilizing the tamping machine frame and extended measurement buggies to measure the track geometry data at slow speeds (<5 kph). Inertial measurement systems can measure up to speeds in excess of 200 kph.

Exemplary Precision Rail Track Measurement System

Figure 1:
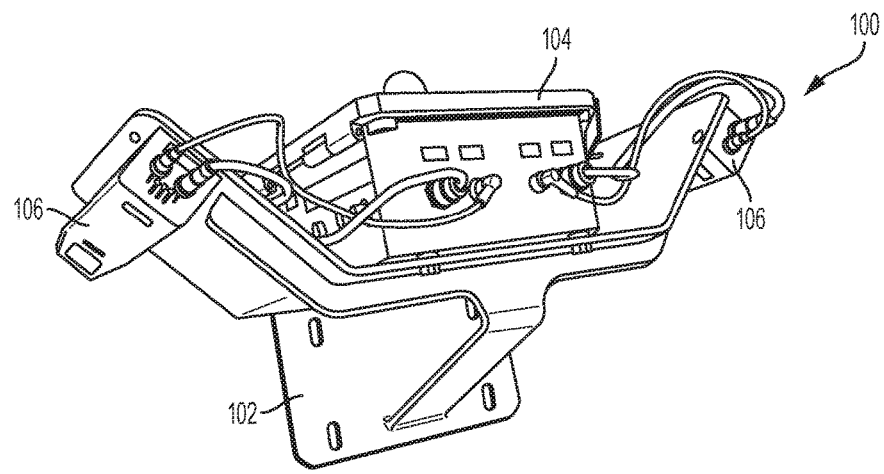
FIG. 1 is a perspective view of an exemplary measurement unit.
Figure 2:
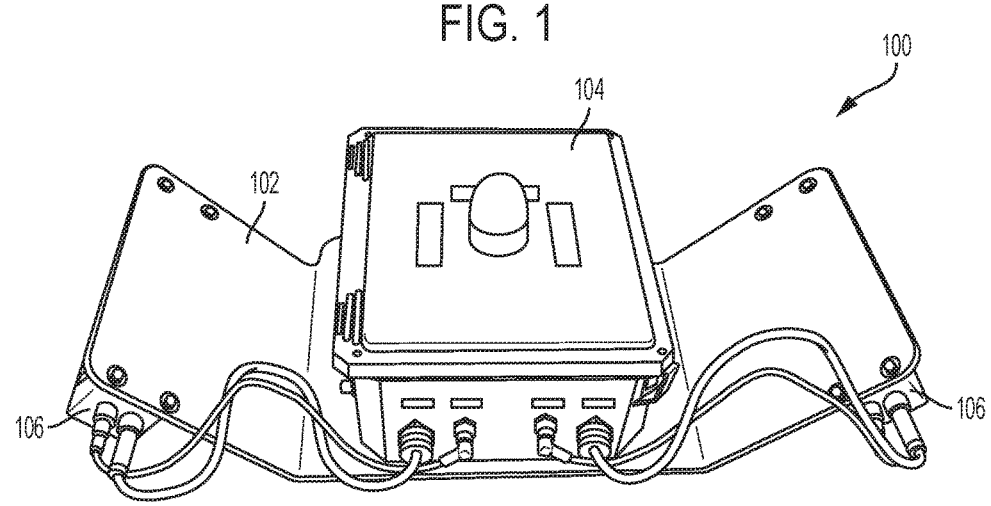
FIG. 2 is a perspective view of an exemplary measurement unit.
Figure 3:
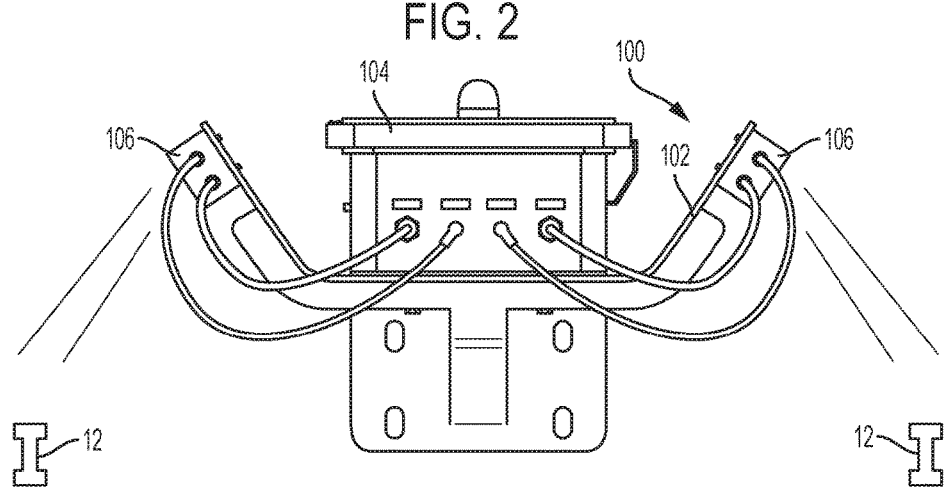
FIG. 3 is a side vide of an exemplary measurement unit.

Referring to FIGS. 1-3, a measurement unit 100 includes a frame member 102 and a sensor housing 104. As shown in more detail in FIG. 9, within the sensor housing 104, the measurement unit 100 includes a GPS 302 and Inertial Measurement Unit (IMU) 304. The GPS 302 may include an internal or external GPS antenna 306. In some embodiments, the GPS may be external to the sensor housing 104 and GPS data is provided to the processor 308 via the communications interface 310.

One or more laser measurement units 106 may also be coupled the frame member 102. The laser measurement units 106 may interface to the processor 308 via the laser interface 312. The laser measurement units 106 scan the profile of the rail. With reference to FIG. 3, the laser measurement units 106 scan a the sectional profile of the rail 12 at a particular location. This information may be used by the processor 308 (or the data may be saved in the memory 314 or transmitted by the communication interface 310 for processing by an external processor) to determine rail maintenance operations needed at this location. For example, the rail profile may need to be ground, or the rail may need to be repositioned, such as via a tamping operation, because it is horizontally or vertically out of alignment.

Figure 4:
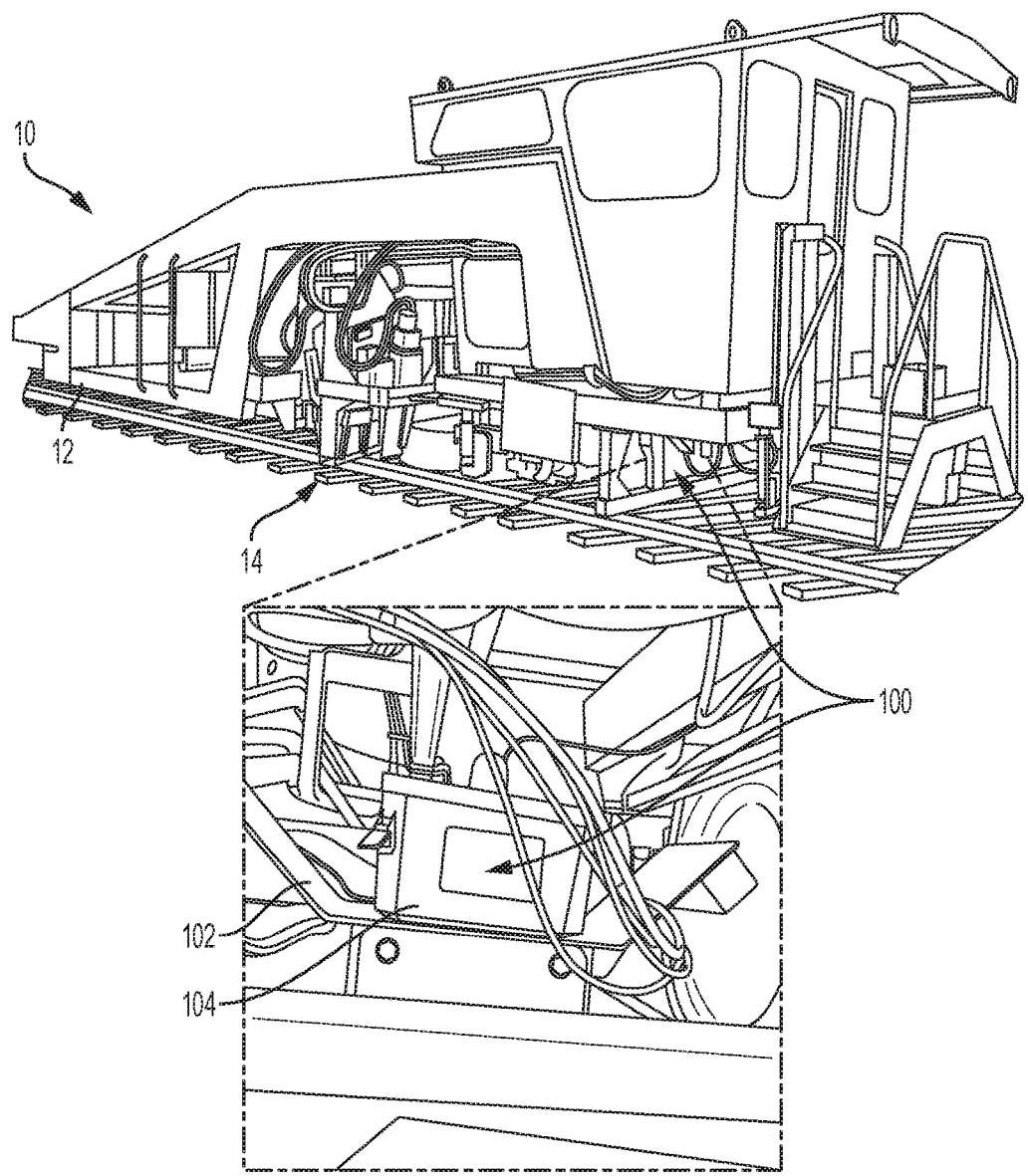
FIG. 4 is a perspective view of an exemplary measurement unit installed on a rail maintenance vehicle.

Referring to FIG. 4, the frame member 102 may be coupled to a rail maintenance vehicle 10. A tamping machine is illustrated but it will be appreciated that other rail maintenance vehicles may be used. Preferable, the frame member 102 is coupled to a frame of the rail maintenance vehicle forward of the work heads 14.

The IMU 304 may record data any time the rail maintenance vehicle 10 is in motion and at speeds up to 50 kph. The IMU 304 may include several accelerometers and gyros. In a preferred embodiment, the IMU 304 includes three accelerometers and three gyros respectively having orthogonal sensitivity axis to provide three dimensional measurements. Rail maintenance vehicles may be subjected to intense vibration energy. Preferably, the IMU 304 includes solid state accelerometers and gyros to better withstand environmental factors.

Signals from accelerometers and gyros of the IMU 304 may be made available to the processor 308 for analysis that transforms the signals into meaningful geometry measurements such as gauge, curvature, alignment variation, super elevation, cross-level and cross-level variations, top-surface (left and right rail) and twist/warp. These meaningful geometry measurements may be stored in the memory 314 for later use or transmitted by the communication interface 310 to be made available to other devices an processors on the rail maintenance vehicle 10 or external to the rail maintenance vehicle 10.

Inclusion of the measurement unit 100 on a tamping machine offers several exemplary advantages. The collection of track data prior to beginning work may be accomplished by the tamping machine itself avoiding a need for additional measurement equipment. Track data can be obtained anytime the tamping machine is moving, which may reduce or even eliminate additional runs over the track if the tamping machine has recently run over the track to be worked. Track data can be collected at much higher speeds. For example, the IMU 304 on the tamping device may collect data at up to 50 kph and in some cases may collect data with higher accuracy at the higher speeds. Pre-recording data at higher speeds such as 50 kph may increase the quantity and quality of geometry correction operations. In contrast, collecting track data with a buggy system may by limited to speeds below 5 kph. Avoidance of use of a buggy system may also increase safety in the workplace as the buggy system may present potential hazards.

Utilization of the measurement unit 100 integrated with the rail maintenance vehicle 10 to provide pre-recording of data that is then analyzed. The determined corresponding adjustments to the track may be automatically identified, and appropriate corrections made.

Figure 5:
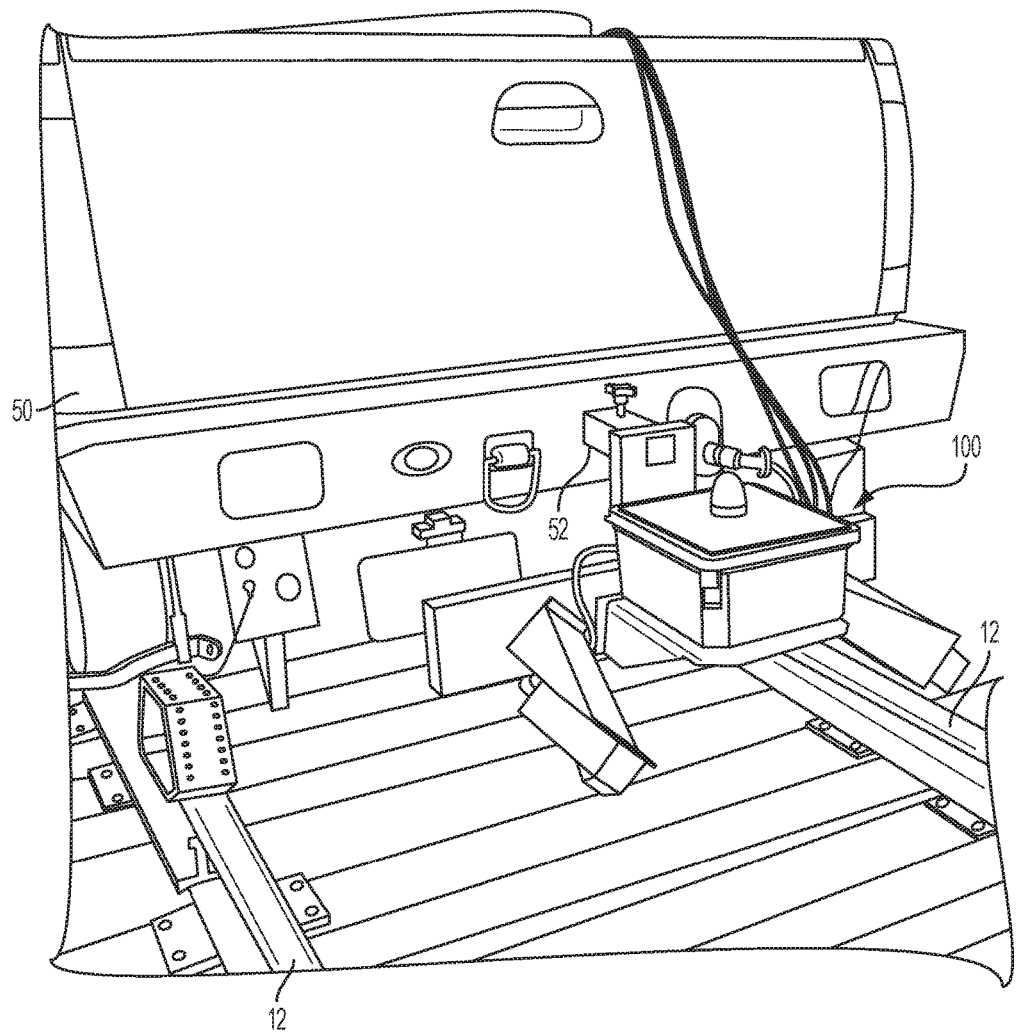
FIG. 5 is a perspective view of an exemplary measurement unit installed on a hybrid rail/road vehicle.

Referring to FIG. 5, the measurement unit 100 may also be coupled to a high speed measurement vehicle 50. The high speed measurement vehicle 50 may be a hybrid rail/road vehicle. The measurement unit 100 may be light weight and compact in size, which may be easily coupled to the hybrid rail/road vehicle 50 via the receiver 52. The improved accuracy and measurement rates of the measurement unit 100 including the IMU 304 make it possible to collect measurements using vehicles that were not previously used for measurement collection thereby reducing costs and avoiding a need for expensive special purpose machinery. In the example of the measurement unit 100 may be quickly coupled to the receiver 52 of a hybrid rail/road vehicle 50, thereby quickly and inexpensively providing a vehicle capable of collecting rail measurement information.

Track Alignment and Curvature Analysis Using Inertial Navigation and an Advanced GPS Module In an embodiment, the GPS 302 of the measurement unit 100 may include an advanced GPS module (for example, a GPS with a 50 channel receiver with a high update rate) and may provide enhanced GPS data multiple times a second. The measurement unit 100 may refine the accuracy of the GPS data based on the inertial data of the IMU 304. For example, the inertial navigation unit (e.g., the measurement unit 100) may include 3-axis accelerometers, 3-axis roll gyros, 3-axis magnetometers in the IMU 304 and an altimeter 314. The inertial navigation unit can use these channels to enhance the GPS data of the GPS 302 beyond what would be possible from the GPS receiver alone.

By analyzing GPS coordinates, track design geometry can be estimated using long chordal lengths that may reduce the impact of positional uncertainty to levels that are otherwise difficult or expensive to obtain.

In an example, latitude and longitude are converted to units of feet in the north and east directions. In a horizontal plane, two locations between 100 to 300 feet apart are chosen from the data. A third point between these two points defines a unique circular arc from which the track curvature is computed. Recorded GPS (and inertial) data is processed to provide a virtual chord that moves along the track. The length of the chord is long enough to reduce the inaccuracies in the GPS locations to a level that makes it possible to estimate the design curvature of the track. This provides a way of verifying curvature reported by the inertial system (that does not necessarily use GPS) using this alternative method.

Figure 6:
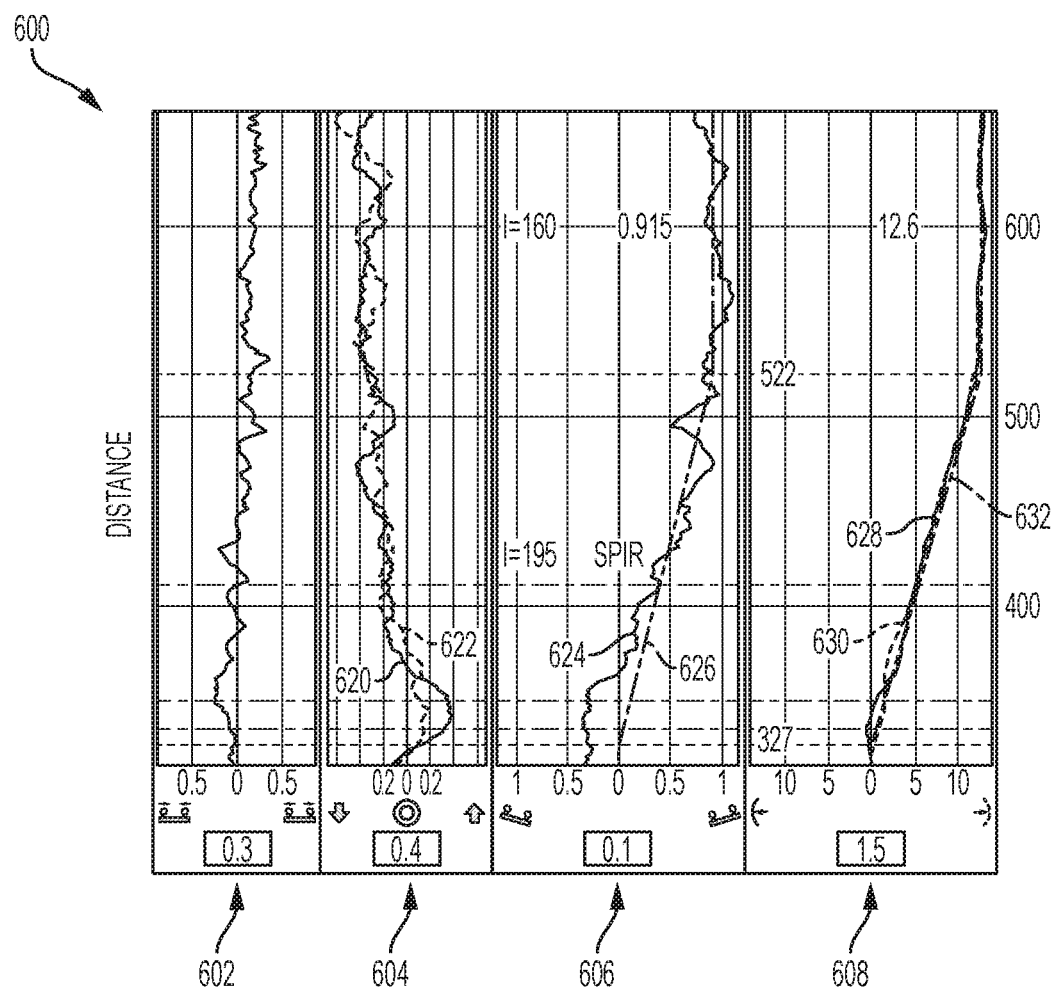
FIG. 6 is a plot of exemplary measurement data.

FIG. 6 is an exemplary plot 600 of geometry measurements including four panels. The first panel 602 (track gauge) shows deviations from the nominal track gauge (e.g., 56.5"). The deviations may be detected by accelerometers of the IMU 304 have a sensitivity axis corresponding to a width-wise direction of the track and/or measurements of the laser measurement units 106.

The second panel 604 (track surface) shows left rail height 620 and right rail height 622. The height may be detected by accelerometers of the IMU 304 have a sensitivity axis corresponding to a vertical direction of the track, a width-wise direction of the track (detecting roll), and a length-wise direction of the track (detecting pitch) and/or measurements of the laser measurement units 106.

The third panel 606 (track superelevation) shows height difference between rails as measured 624 and design value estimated from measurements 626. The superelevation may be detected by accelerometers of the IMU 304 have a sensitivity axis corresponding to a vertical direction of the track, a width-wise direction of the track (detecting roll), and a length-wise direction of the track (detecting pitch) and/or measurements of the laser measurement units 106.

The fourth panel 608 (track alignment or curvature) shows left rail curvature 628, right rail curvature 630, and design estimation of track curvature 632. The units shown are in degrees of heading change in 100 feet.

Figure 7:
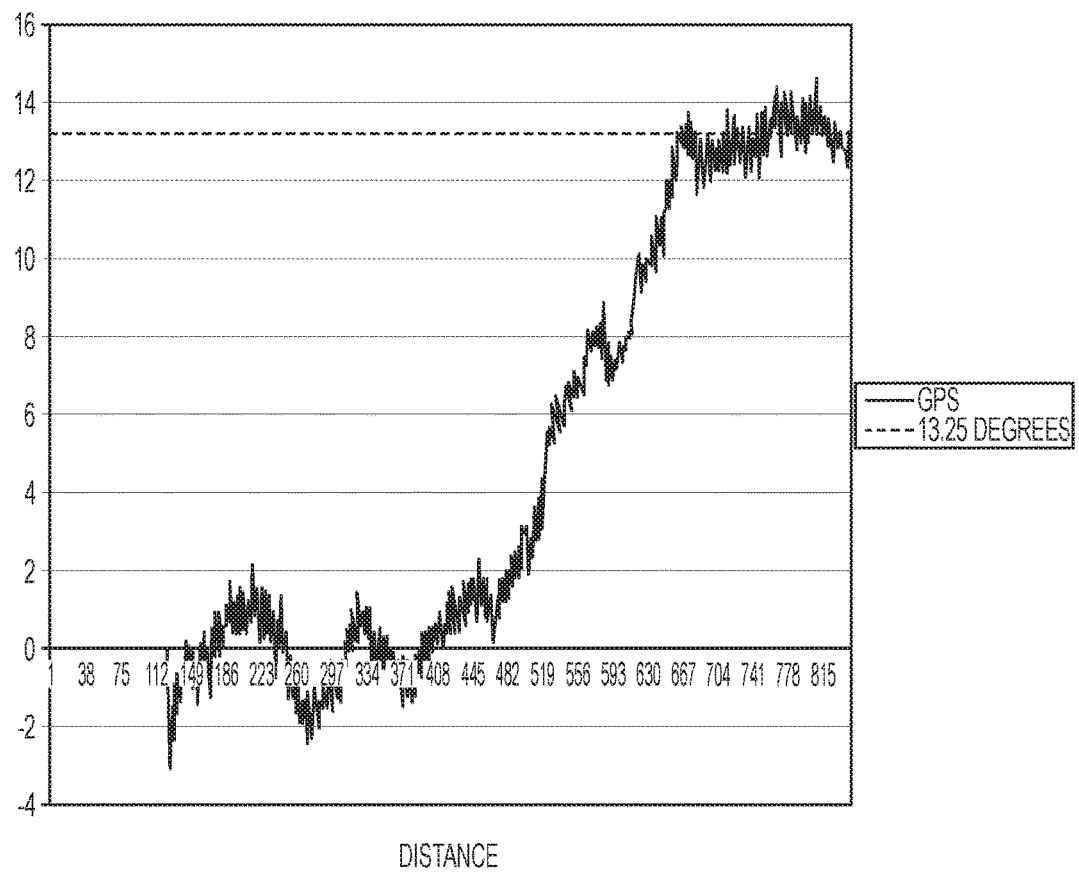
FIG. 7 is a plot of exemplary measurement data.

FIG. 7 illustrates exemplary track curvature and layout measurements determined using GPS data. In the plot, the x-axis is distance in feet. Comparing FIG. 7 and panel 608 of FIG. 6, the resultion of the inertial measurement data is significantly higher than GPS data alone. Further, the inertial measurements may resolve the left and right tracks individually, which is mush more difficult, if at all possible, using GPS alone. In this example, the y-axis is the curvature measurement based on lateral GPS coordinates of the measured track at each foot translated into degree of curvature. The actual curvature is 13.25 degrees, marked in the plot with a dotted line. The GPS alone does not arrive near a correct measurement for some distance.

In panel 608 of FIG. 6, the curvature calculated based on IMU data is much more accurate and less noisy. The curvature may be computed by performing finite integration calculations on the IMU data (e.g., acceleration and gyration). The resultant output is degree of curvature. In the panel 608, a segment of track which is a reverse curve (e.g., S curve) is depicted with angles of +6 degrees right to −6 degrees left. The y-axis is the degree of curvature and the x-axis is distance.

Operation may be fully automatic such that data can be automatically recorded any time that the machine on which the measurement unit 100 is mounted is travelling on the track. The obtained data may also be plotted on a map, for example, using the collected GPS data.

Determining Curve Design and Desired Adjustments

When the measured data from the track geometry system, for example onboard the tamper, is acquired, it may be analyzed to determine the desired position of the rails 12. This can be based on smoothing or absolute position. Analyzing the existing position in the vertical and horizontal planes as determined from the high speed recording using the inertial based geometry system of the measurement unit 100, the desired adjustments can be determined. These adjustments can then be applied automatically, for example by the tamper once the tamper travels back to the measured track location.

Aligning Geometry Data Using GPS and Inertial Data

Aligning successive track geometry car runs is important for comparative purposes to make sure that the actual position of equipment relative to a point in a previously collected data set is aligned. Alignment techniques using milepost and foot offsets from collected data may be error prone due to user offsets that may be off as much as 15 meters. Alignment techniques using painted marks on the rail may be subject to loss of the alignment mark (due to weathering, etc), and are labor intensive, slow, and require track workers working in close proximity to the track, which may present safety risks. Alignment using GPS data alone may be insufficient as GPS data may be prone to errors of up to 3 meters and/or require excessively long times to obtain signals from enough satellites to provide a position fix.

In an embodiment, inertial data of the IMU 304 is used as a "signature" for locating position within a data set. Small variations in the track impart small motions to equipment travelling along the track. The randomness of these small variations may create a signature in the data much like a finger print. Using GPS data, a rough location of the equipment may be found in the data set. Then, using the inertial data and cross-correlation techniques, alignment, for example within 4 centimeters, may be quickly, accurately, and efficiently obtained.

In an example, the measurement unit 100 may be lowered toward the rails 12. It is not necessary for the measurement unit 100 to make direct contact with the rails 12 (for example, measurement buggies do not have to be deployed). The GPS 302 may be used to locate a most recent applicable file in the memory 314 associated with a region determined based on the GPS fix. Then, the equipment is advanced while measuring inertial data of the IMU 304. In contrast to GPS data for which stillness for a long period of time is desirable to increase the accuracy of a fix, inertial data is preferably obtained in motion. Thus, the alignment may be obtained when approaching a worksite without requiring downtime between arrival at a worksite and beginning work. The file may be searched using the cross-correlation for the signature of the inertial data to align the position of the equipment with the data.

In another example, laser measurement units 106 may be used to align the data in place of or in addition to the inertial data. The laser measurement units 106 may measure a gauge of the track with precision. The gauge may be defined as the distance between the rails 16 mm below the top of the rail. The accuracy of the laser measurement units 106 may be on the order of 2 mm or less. Small variations in the location of the tracks may provide a "signature" much like the inertial data discussed above. Thus, the file may also be searched using the cross-correlation for the signature of the laser measurement data (for example, the gauge data) to align the position of the equipment with the data.

Example of Cross-Correlation Determination

Cross-correlation analysis of one stream of data to another (x and y in the equation below), defined by the equation below, provides an index of how well one stream of data correlates to another. In effect, the "lag" (or offset of one data set to another, d in the equation below) can be determined by evaluating the correlation coefficient. Note that mx and my are the means of x and y respectively. A correlation coefficient of 1 means exact correlation. The equation below is use iteratively to determine the lag between two data sets for which the correlation coefficient is a maximum.

$$r(d) = \frac{\sum_i [(x(i) - mx) * (y(i-d) - my)]}{\sqrt{\sum_i (x(i) - mx)^2} \sqrt{\sum_i (y(i-d) - my)^2}}$$

Figure 8A:
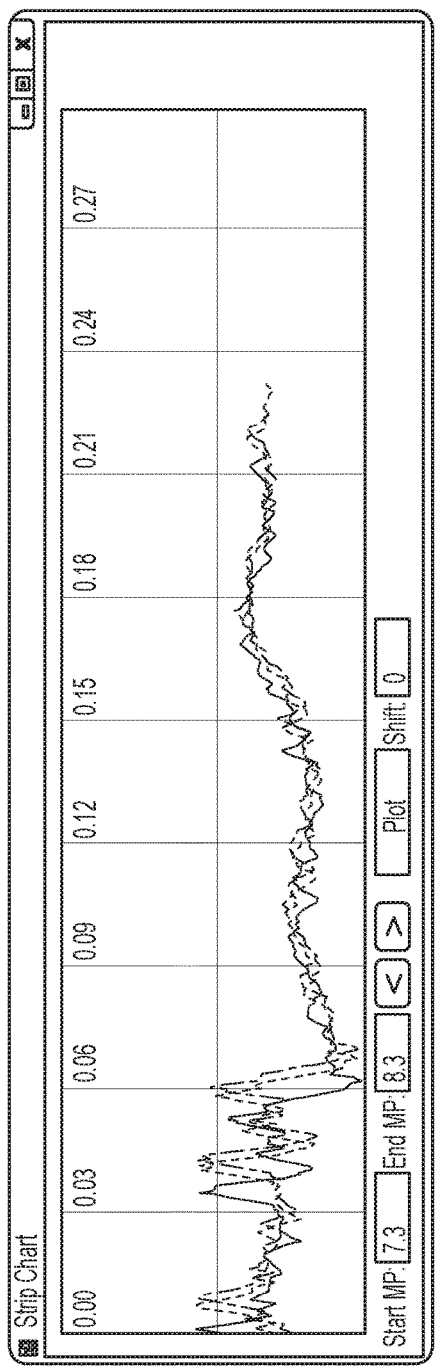
FIG. 8A is a plot of exemplary unaligned measurement data.
Figure 8B:
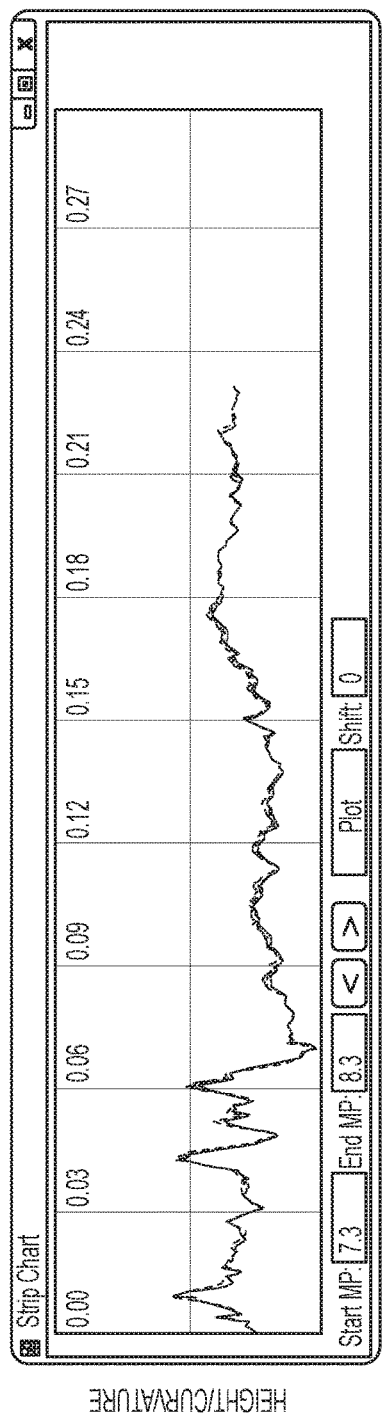
FIG. 8B is a plot of exemplary aligned measurement data.

FIGS. 8A and 8B show two data streams before (8A) and after (8B) alignment using the cross correlation analysis. Programmatically, the best alignment may be achieved very efficiently. Once the data is properly aligned, a precision analysis can be performed.

In an example, a precision analysis was performed for approximately 300 meters of data to remove the startup transients associated with any inertial track geometry measurement system. In order to determine the precision, the mean of the three measurements for each foot was determined. The error was then defined as the measurement minus the mean for each of the three measurements. This resulted in a population of 950*3=2,850 error measurements. The standard deviation of these errors may be referred to as the precision.

After aligning the track to the stored measurements and/or measuring the track, the rail maintenance vehicle 10 may carry out maintenance activities like tamping based on the rail measurements. For example, the track may be adjusted from a current measured position to a desired position by the work heads 14. The present location of the rail maintenance vehicle 10 may be determined based on information from the GPS 302 or the inertial measurement unit 304. That location may be associated with an assigned maintenance activity (such as moving the track a prescribed amount) in instructions stored in the memory 314 or on another device interfaced with the measurement unit 100 via the communications interface 310.

Figure 9:
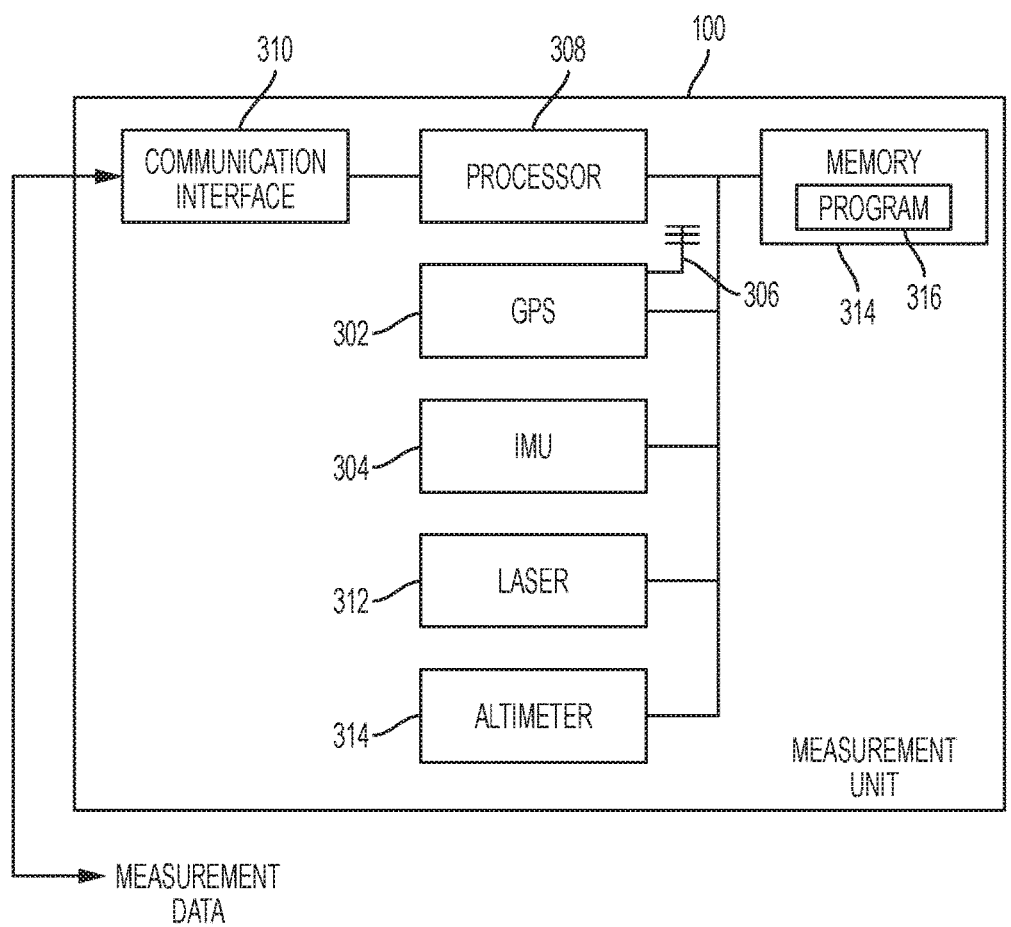
FIG. 9 is a block diagram of an exemplary measurement unit.

Referring to FIG. 9, some embodiments of the measurement unit 100 may include a processor 308 configured to execute at least one program 316 stored in a memory 314 for the purposes of processing data to perform one or more of the techniques that are described herein. The processor 308 may be coupled to a communication interface 310 to receive data such as remote location data or files containing previous track measurements. In addition to storing instructions for the program, the memory 31 may store preliminary, intermediate and final datasets involved in the techniques that are described herein. It will be appreciated that the measurement unit 100 shown in FIG. 9 is merely exemplary (for example, the display may be separate from the computer, etc) in nature and is not limiting of the systems and methods described herein.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. A track geometry measurement system, comprising:
a plurality of wheels operable to trail over rail track;
a frame coupled to the wheels;
an inertial measurement unit (IMU) coupled to the frame;
a global positioning system (GPS) coupled to the frame;
a memory configured to store IMU data; and
a processor configured to
determine a relative position of a portion of the frame based on data from the GPS and data from the IMU,
determine a signature based on the data from the IMU, and
search IMU data stored in the memory for the signature to align the position with the IMU data stored in the memory.

2. The track geometry measurement system of claim 1, wherein the processor is configured to determine a lower precision location based on the data from the GPS and a higher precision location based on the IMU.

3. The track geometry measurement system of claim 2, wherein the processor is configured to determine a chord between two points of GPS data and to determine a location of the chord between the two points based on the IMU data.

4. The track geometry measurement system of claim 1, wherein the processor is configured to align the data using cross-correlation.

5. The track geometry measurement system of claim 1, wherein the memory is configured to store GPS data, and the processor is configured to determine a lower precision location by searching the memory based on the GPS data and thereafter improving the precision of the determined location by searching the memory based on the IMU data associated proximal to the lower precision location.

6. The track geometry measurement system of claim 1, wherein the processor is configured to determine a track gauge based on the IMU data.

7. The track geometry measurement system of claim 1, wherein the processor is configured to determine a rail height based on the IMU data.

8. The track geometry measurement system of claim 1, wherein the processor is configured to determine a curvature of a rail based on the IMU data.

9. The track geometry measurement system of claim 1, wherein the processor is configured to determine a difference between the rail height and a desired rail height.

10. A track maintenance vehicle, comprising:
the track geometry measurement system of claim 9; and
a work head configured to perform maintenance on a rail of the rail track based on the determined difference.

11. The track geometry measurement system of claim 1, further comprising a laser measurement system coupled to the frame, the laser measurement unit configured to measure a profile of a rail of the track.

12. The track geometry system of claim 11, wherein the processor is configured to determine the relative position based on data from the laser measurement unit.

13. The track geometry measurement system of claim 12, wherein the processor is configured to determine a lower precision location based on the data from the GPS and a higher precision location based on the laser measurement unit.

14. A tamper, comprising:
a plurality of wheels operable to trail over rail track;
a frame coupled to the wheels;
a work head operable to tamp ballast and coupled to the frame;
an inertial measurement unit (IMU) coupled to the frame;
a global positioning system (GPS) coupled to the frame;
a memory configured to store IMU data; and
a processor configured to
determine a relative position of a portion of the frame based on data from the GPS and data from the IMU and to control the work head to tamp the ballast based on the IMU data,
determine a signature based on the data from the IMU, and
search IMU data stored in the memory for the signature to align the position with the IMU data stored in the memory.

15. The tamper of claim 14, wherein the processor is configured to determine the relative position based on the data from the IMU while the tamper is travelling over the rails.

16. The tamper of claim 14, wherein the processor is configured to determine the relative position based on the data from the IMU while the tamper is travelling over the rails and before the tamper reaches a location at which the work head begins tamping the ballast.

17. The tamper of claim 14, wherein the memory is configured to store GPS data, and the processor is configured to determine a lower precision location by searching the memory based on the GPS data and thereafter improving the precision of the determined location by searching the memory based on the IMU data associated proximal to the lower precision location.

18. The tamper of claim 14, wherein the processor is configured to determine a position of a rail based on the IMU data, to determine a difference between the position of the rail and a desired position, and control the work head to tamp the ballast based on the determined difference.

* * * * *